April 5, 1955
A. K. BREWER
2,705,594
EMULSIFILM DIFFUSION
Filed Nov. 22, 1948
3 Sheets-Sheet 1
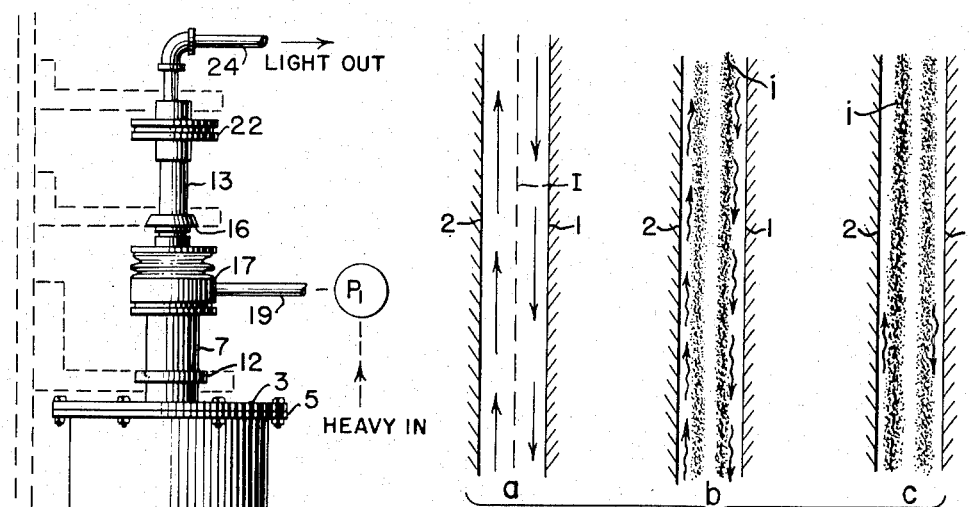
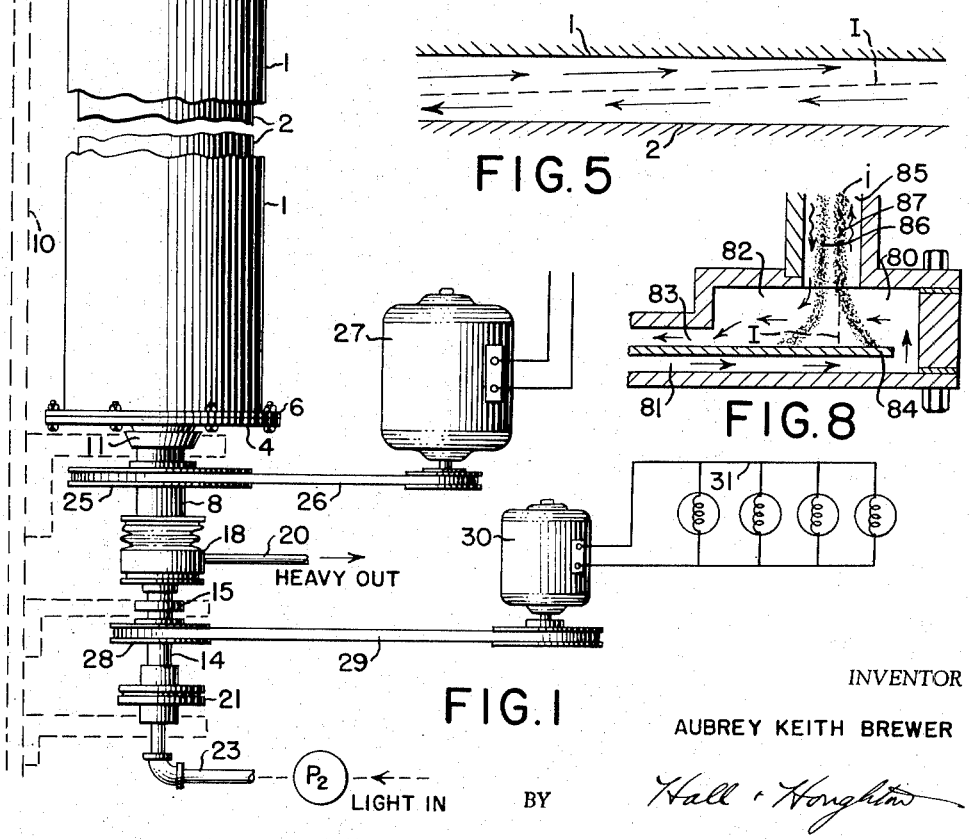
INVENTOR
AUBREY KEITH BREWER
BY *Hall & Houghton*
ATTORNEYS

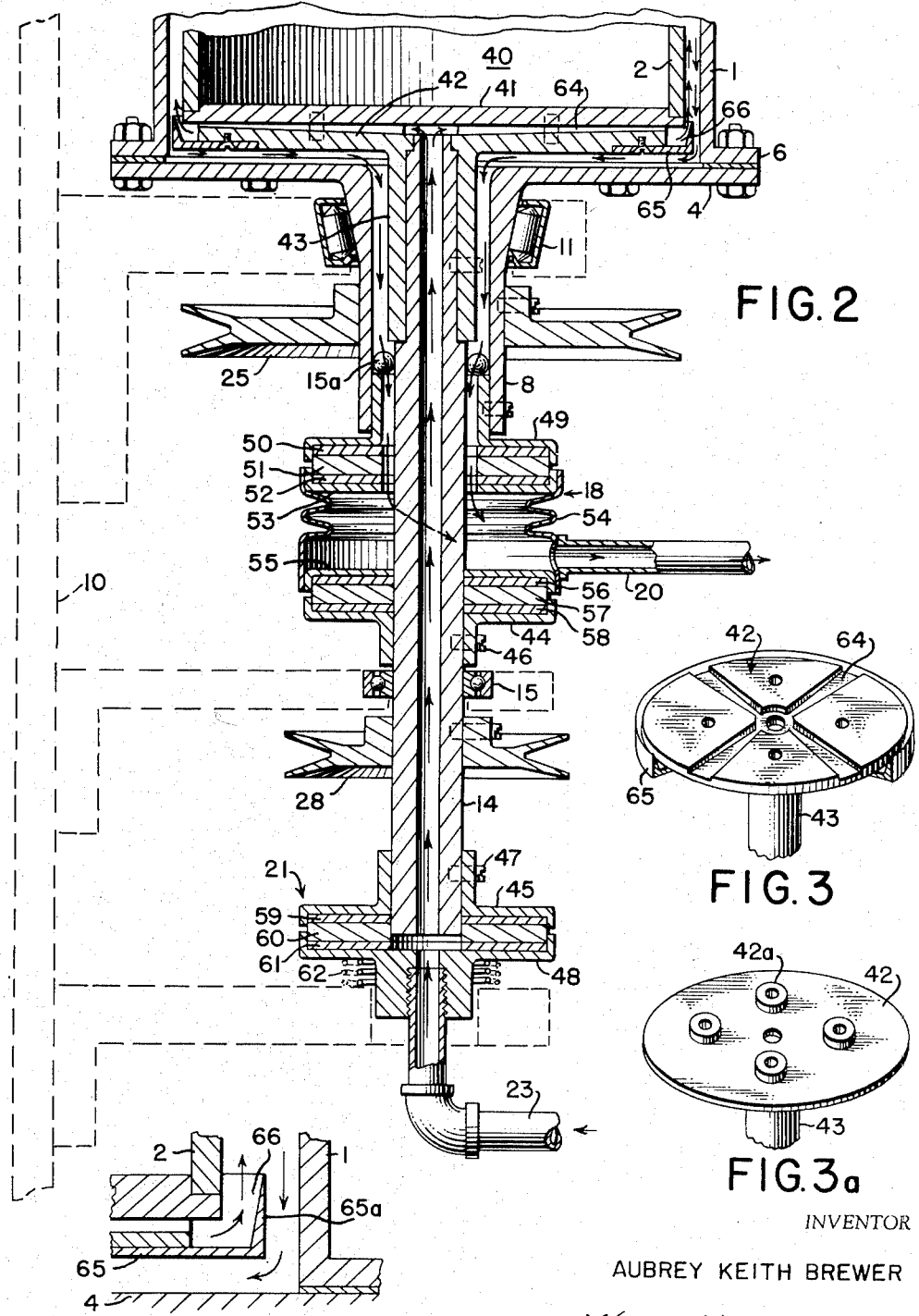
April 5, 1955     A. K. BREWER     2,705,594
EMULSIFILM DIFFUSION
Filed Nov. 22, 1948     3 Sheets-Sheet 2
INVENTOR
AUBREY KEITH BREWER
BY
ATTORNEYS ated Apr. 5, 1955

2,705,594

EMULSIFILM DIFFUSION

Aubrey Keith Brewer, Washington, D. C.

Application November 22, 1948, Serial No. 61,449

13 Claims. (Cl. 233—15)

This invention relates to an apparatus and method for effecting diffusional contact of materials and is especially adapted to countercurrent purification of one fluid by a solvent fluid immiscible therewith, having a different density, and having preferential solvation for components of the first named liquid. The invention is not, however, limited to extraction problems as its principles can be used with benefit in facilitating chemical reaction between immiscible fluids or ingredients carried thereby. It is also feasible to employ the principles of the invention to achieve countercurrent fractionation of a solute mixture having a different solubility ratio in the respective immiscible solvents.

In open tube extractor columns heavy liquids flow downwardly through contact tubes while lighter fluids are bubbled upwardly therethrough, or lighter fluids flow upwardly while droplets of heavier fluids descend therethrough.

In ordinary contact towers Rashig rings or the like are employed in an effort to break up the fluids and increase the area of contact therebetween. To the same end Ney and Lochte preferred (Ind. Eng. Chem. 33, 825, year 1941) that a spinner be located in the tube and operated at a speed which would effect breaking up of the bubbles or droplets thus to increase the contact area. The amount of contact increase while maintaining countercurrent flow which would be effected in this manner, however, was very limited, because as turbulence was approached the entire contents of the tube broke into an emulsified state completely blocking the countercurrent flow.

Other contact processes have first mixed two fluids into a completely emulsified state and thereafter separated them by gravity (settling and decanting) or by centrifugal separation, but these processes are bulky and involve large holdup and other disadvantages. Attempts to reduce the quantities involved in the alternate mixing and separating stages, to reduce the holdup and size of the apparatus have been made, but in such instances the essentially batch-character of the process has been retained.

In contrast to these prior batch-treatment methods, Podbielniak proposed to flow two fluids in countercurrent layers progressing radially in opposite directions within the confines of a scroll, which was rotated to maintain separation of the countercurrent layers by centrifugal force while the two liquids were pumped in the countercurrent directions, and were in intimate contact at the interfaces between the layers. Apart from the mechanical difficulties of maintaining accurate scroll spacing and avoiding "islands," in this arrangement interface exchange is induced by the motion of the two contiguous layers with respect to one another in the direction of the throughput greatly limiting the equivalent platage obtainable even with a great number of spiral convolutions. In addition, the variation of centrifugal force with the radius of the spiral makes it impossible as a practical matter, to obtain very effective mixing, except at a very limited region when the scroll is of minimum radius. Any attempt to extend the region of effective mixing to outlying portions of the scroll results in complete emulsification in the portions thereof of least radius blocking the countercurrent flow.

The present invention has for its principal object the provision of a new method and apparatus overcoming the aforesaid difficulties.

An object of the present invention is to achieve continuous filmwise turbulent contact between immiscible materials and at the same time a controlled degree of emulsification or mixing thereof.

An additional object is to achieve continuous countercurrent turbulent contact of immiscible materials without necessitating high countercurrent flow rates whereby ample transfer may be obtained in a relatively short distance.

A further object is to provide selectivity of the thickness and degree of turbulence of continuously contacting immiscible fluid sheets independent of the throughput.

Another object is to provide an apparatus for fluid contact in which low holdup and fast equilibrium time as well as high theoretical platage are achieved.

Still further objects are to provide apparatus of extremely high efficiency and capacity relative to prior constructions of comparable size, yet to provide an apparatus of simple, durable, and economical construction, which is readily dismantled and reassembled and is otherwise well adapted for its intended purposes.

These and other objects which will be apparent from the following description, are achieved according to this invention, by confining the contacting materials, of which at least that of greatest density is a liquid, in the form of elongated cylindrical sheets established between concentric smooth cylinders both of which rotate in the same direction and counterflowing longitudinally at a rate determined by external pressure heads. The outer cylinder is rotated at a sufficient speed to subject both sheets, and especially the heavier sheet in contact therewith, to intense centrifugal forces, and the inner cylinder is rotated at a controlled speed sufficiently greater or less than that of the outer cylinder to subject the two phases to circumferential shear. By adjusting the difference in speeds of the two cylinders the circumferential flow and the degree of turbulence or interdispersion between phases is controlled. In this manner a turbulent condition is set up in and between the two liquids; at the same time a portion of at least one phase, and preferably of each phase, adjacent its adjoining wall, is maintained entirely free of the other phase by reason of the intense centrifugal forces brought into play by rotation of the outer cylinder.

The invention comprises the novel features and steps and combination thereof hereinafter described and defined in the appended claims.

For a better understanding of the invention, reference is had to the following description and drawings illustrating the application of the invention to a countercurrent extractor.

In the drawings of this illustrative embodiment:

Fig. 1 is a side elevation of an extracting apparatus showing the two cylinders of the column;

Fig. 2 is a vertical sectional view of the lower portion of the column of Fig. 1;

Fig. 3 is a perspective view of a detail;

Fig. 3a is a perspective view of an alternative form of channeling plate;

Figs. 4 and 5 illustrate several conditions of contact obtainable in the columns of Fig. 1;

Fig. 7 is an enlarged detail of a portion of Fig. 2; and

Fig. 8 is a sectional detail of an alternative feeding and withdrawal arrangement.

Figure 6:
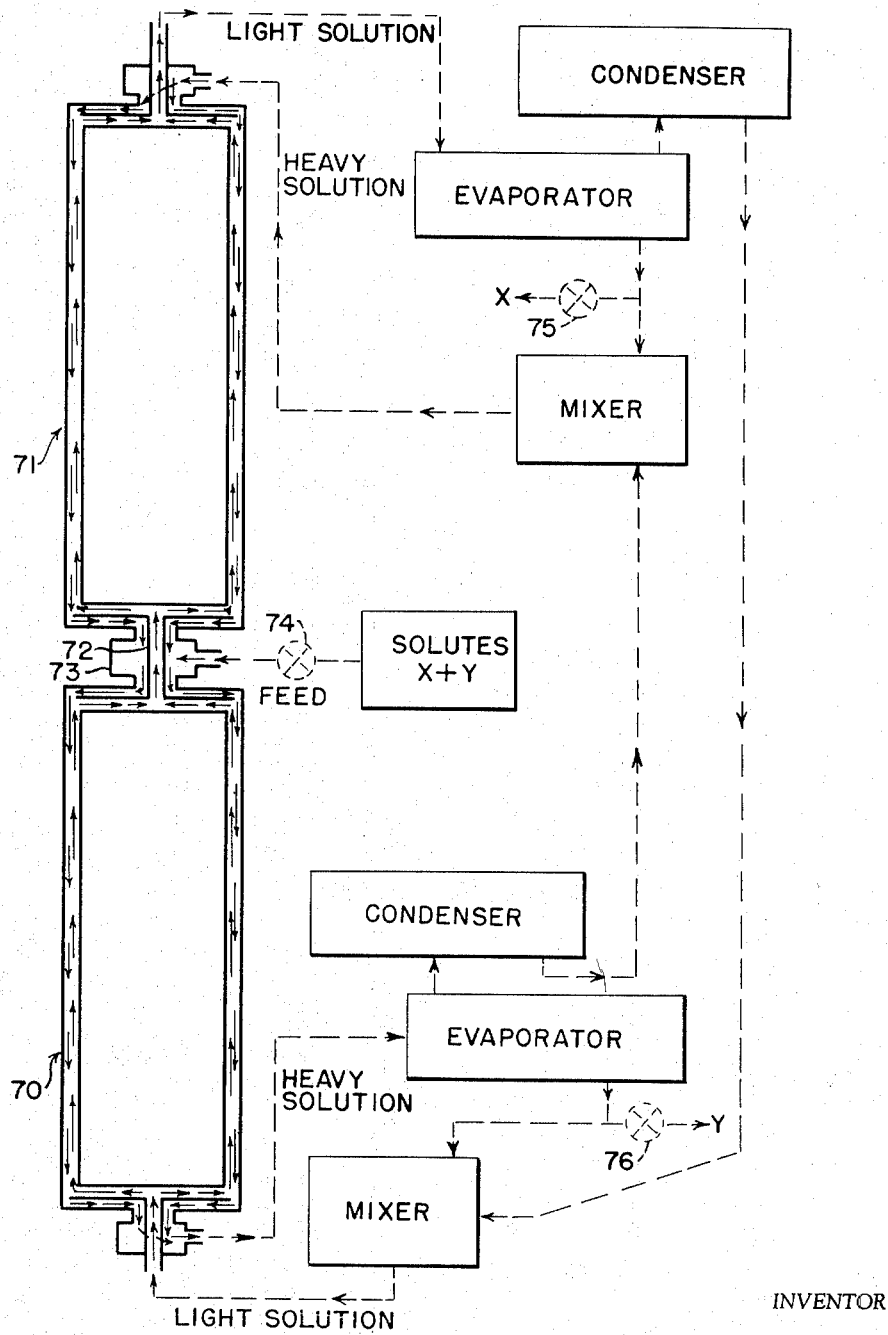
Fig. 6 is a schematic diagram of a system for continuous fractionation of a binary solute mixture and utilizing two of the columns illustrated in Fig. 1.

Referring to Fig. 1, the column proper is seen to consist of outer and inner smooth concentric cylinders 1 and 2 mounted for independent rotation. The surfaces of these cylinders may be uniformly lightly etched or grained to augment their fluid-rotating effect, but without departure from virtual uniformity of cylindrical radius thereof. Upper and lower end plates 3 and 4 are bolted to the respective flanged ends 5 and 6 of the outer cylinder 1. The end plates 3 and 4 have hollow hubs 7 and 8 through which extend hollow shafting for the inner cylinder, thus providing the inlet and outlet passages for the liquids herein exemplifying the materials to be contacted. The various parts of the column are carried on a panel 10 through the agency of suitable brackets. One such bracket carries the weight of the outer cylinder by a thrust bearing as indicated at 11. An aligning bearing 12 is provided for the upper hub 7.

The inner cylinder of the column is carried by hollow end shafts 13 and 14 suitably supported, as by an upper thrust bearing 16 and a lower alignment or thrust bearing 15.

The heavy liquid phase is supplied by a pump $P_1$. To provide for flow to and from the apparatus, inlet and outlet casing units 17 and 18 having connecting pipes 19 and 20 are arranged in communicative relation with the rotatable hubs 7 and 8, respectively, through sealing means hereinafter described. Similar seals are provided for the hollow end shafts 13 and 14 at their junctures with the end walls of the casing units 17 and 18.

The light liquid phase is supplied by a pump $P_2$ and pipe 23 to the hollow shaft 14 through a lower sealing unit 21 and is withdrawn from the upper hollow shaft 13 through the agency of an upper sealing unit 22 and pipe 24.

The outer cylinder is suitably rotated as by a pulley 25 fastened to the lower hub 8 and driven through a belt 26 by the motor 27. For suitable control of rotation of the inner cylinder, a second pulley 28 is fastened to the lower hollow shaft 14 and by means of belt 29 serves to drive a generator 30. The generator is connected to a lamp bank indicated diagrammatically at 31. In lieu of generator 30 a variable speed motor may be substituted.

Referring now to the lower end construction of Fig. 2, it will be understood that the details shown, except for the pulleys, are duplicates of the construction at the top of the column. In this embodiment the inner cylinder has end plates welded thereto and forming a sealed chamber 40 which may be employed as a dead air space or otherwise, as desired. The lower of these plates, indicated at 41, is fastened by screws to a plate member 42 having an integral hub 43 which receives the hollow shaft 14 and is fastened thereto by a set screw. It is thus seen that the inner cylinder 2, plate member 42, and hollow shaft 14 rotate as a unit.

Also rotatable with the hollow shaft 14 are the flanged collars 44 and 45 which are affixed to the shaft 8 by set screws 46 and 47. A stationary flanged collar 48 is carried by the light liquid inlet pipe 23.

The spaced concentric relation of hub 8 to the hub 43 and shaft 14 provides a passage for the heavy liquid. The concentric relation is ensured by ball bearings indicated at 15a. The annular passage thus formed continues downwardly through flanged collar 49, affixed to the hub 8 by a set screw, and through the sealing means shown as made up of three annular plate members 50, 51, 52 held between collar 49 and the top annular wall 53 of the casing unit 18. The casing unit 18 includes a shell having a Sylphon portion 54, and a bottom wall 55, the latter being rotatable relative to the hollow shaft 14 and sealed against the flanged collar 44 by a second set of sealing plates 56, 57, 58. A third set of sealing means 59, 60, 61 seal the space between flanged collars 45 and 48 and are held in sealing contact by spring 62, it being understood that the connecting pipe 23, as also pipe 20, have sufficient flexibility ot permit limited expansion of the spring 62 and Sylphon 54, and that the latter may embody an expanding spring if desired.

The plate member 42, as seen more clearly in Fig. 3, has radial grooves 64 which receive light liquid from the hollow shaft 14. A skimming ring 65 is fastened to the underside of plate 42 the rim of which lies approximately beneath the midspacing of the cylinders, as indicated in Fig. 2. As shown in Fig. 7, the skimming ring 65 may be provided with a skimming flange 65a to intercept the light liquid being accelerated by the grooves 64, to prevent turbulent mixing when such grooves are employed.

As is shown in Fig. 3a, the plate 42 may have its grooves widened into a continuous space, with its spacer elements 42a reduced to minimum size so that any impelling effect thereof will be lost, and the liquid will approach the rim of the plate with no more radial velocity than that of the liquid in the annular chamber, in which event no flange 65a is required. With these constructions, and under the centrifugal forces present during operation, the light and heavy liquids at the bottom of the column are segregated at all points inwardly of the interface and an annular pocket 66 is formed from which the light liquid begins its ascent. As will be understood, the segregation at the top of the column is likewise achieved by a construction similar to that described.

In practice the size of the inner cylinder is selected to provide a spacing best suited to the liquids being contacted and the size of the skimming ring 65 is chosen accordingly. The permissible spacing between cylinders is dependent on the character of the fluids dealt with and the character of the process being facilitated. Ranges from about 2 mm. to about 8 mm. are permissible for delicate physical extractions for isotope separations and the like. Larger spacings may be used for gas washing and certain chemical extracting processes. The smaller spacings thus are used where the requirements are for low rates of throughput accompanied by a high degree of refinement of the product. They also enable location of the zone or zones of turbulence at a position well spaced from the confining walls with less difference in speed between the two confining surfaces.

Preferred column diameters range from about four to twelve inches. The length of a single column may range up to twenty or more times its diameter.

In operation of this embodiment in accordance with my preferred method, the outer cylinder is rotated at a fixed rate to obtain a centrifugal acceleration of many times the force of gravity. Acceleration up to 100 to 1000 g. or more may be employed. At this time the inner cylinder may be allowed to rotate with the outer cylinder. The light liquid, for example a lubricant stock requiring refinement, is introduced at constant predetermined rate by pump $P_2$. Simultaneously, the heavy liquid, for example, an aqueous solution having selective solvation for impurities in the lubricant stock, is introduced at constant predetermined rate by pump $P_1$. The layers will be of substantially uniform thickness throughout the column under the influence of the great centrifugal force as illustrated in Fig. 4a. As at this time the slip speed is inappreciable, the two layers will flow in laminar fashion with a sharp interface therebetween indicated by the dotted line I in Fig. 4a.

It will be understood that if the rates in a vertical column exceed those for calculated gravity ascent and descent, then the layers, though maintaining continuity of thickness longitudinally, will assume a tapered continuity in thickness toward their respective outlet ends; i. e., each will be thicker at its inlet end than at its outlet end. Some taper will always be present in a horizontal column, depending on the rate of throughput.

If the rates are set below those calculated, then the layers, though free from any sudden discontinuities in thickness, will become continuously tapered in thickness toward their respective inlets; i. e., each will be thinner at its inlet end than at its outlet end. The column may be operated in this manner, but, in general, it is preferred to operate with layers of approximately uniform thickness. Therefore, it is preferred to select the spacing, by selection of sizes of inner cylinder and skimming rings, to meet the required rates of counterflow and at the same time achieve approximate uniformity of layer thicknesses. For all practical purposes these results can be easily achieved with inner cylinders which provide a range of spacing of from 2 mm. to 8 mm., and this is the preferred range for use in operations for which it is suited.

The generator is now loaded by turning on several of the lamps in the bank 19. Alternatively, a motor can be used to increase the speed of the inner cylinder. This causes relative rotation between cylinders with the following effects: The liquid adjacent each wall tends to be moved thereby at the same rotative speed as that wall. The liquid at some concentric region between the two walls tends to be rotated at a speed which is the mean between the speeds of the two walls. Taking this mean speed of rotation as a base, the liquids adjacent the two walls may be considered as moving in opposite directions relative to the mean speed layer, at speeds nearly equal to half the difference in speed of the respective walls.

When the difference in wall speeds is so low that the portions of the fluids in contact therewith are not moved relative to the mean speed layer at greater than the critical velocities of the fluids, no substantial turbulence is created in the fluids, and the counterflow of phases continues to be laminar as illustrated in Fig. 4a, though each phase, relative to the other, is now rotatively in counterflow, as well as longitudinally, so that some increase of the rate of diffusion between and across the two phases is attained, while the circumferential wiping of both phases serves to mitigate channeling effects.

As further loading of generator 30 occurs, the difference in wall speeds is increased. The portions of the fluids adjacent the walls are thus brought to speeds exceeding their critical velocities relative to the mean layer. Under these conditions turbulence breaks out in the fluid phases adjacent the confining walls. At a still higher difference in rotative speed of the walls the regions of turbulence move away from the walls to positions relatively close to the mean speed layer, and initiate turbulence in close proximity thereto as diagrammatically indicated in Figs. 4b and 4c. By proper adjustment of the throughputs of the two fluids, the position of the virtual interface (i) between them may be adjusted, so that the virtual interface (i), especially is subjected to turbulence creating turbulent mixing of the two fluids at the interface, while simultaneously the rotation of the whole system, creating a centrifugal force many times the force of gravity, is operating to maintain the integrity of a portion of each fluid phase adjacent its confining wall. Fig. 4b represents the interface as positioned in the region of turbulence nearer the outer wall, and Fig. 4c as positioned nearer the inner wall, and it will be appreciated that by adjusting this position the relative proportions of the two fluids in the emulsified strata so produced may be controlled to a certain extent.

With very high rotative speeds, and a high difference in rotative speeds, the regions of turbulence may be forced very close to the mean speed layer and in effect, the mean speed layer may be embraced within the emulsified strata and be itself subjected to communicated turbulence. As the turbulence is oscillatory, and unlike the turbulence in pipe-flow does not disappear when high velocities are attained, but instead becomes more and more concentrated about the region of the mean speed layer, it will be apparent that very high differences in velocity of the two walls may be employed when desired.

When turbulence is established in the interfacial region in spaced relation to the walls 1 and 2, the sharp interface I (Fig. 4a) is replaced by an emulsion layer; the phases are now distinct only at points close to the walls, where they may still be in a somewhat turbulent condition as indicated by the wavy arrows in Figs. 4b and 4c but maintain their integrity as separate phases. This condition gives the optimum rate of transfer between phases, there having been brought into equal and simultaneous effect both the forces of turbulence which cause emulsification and the forces of centrifugal acceleration which cause separation.

The relative difference in speeds of the two moving surfaces for which interfacial turbulence begins under given conditions can be calculated from the known densities and viscosities of the two immiscible fluids, the spacing of the two moving surfaces, and the thicknesses of the two fluid layers, but is preferably arrived at empirically, as the sudden increase in exchange accompanying the establishment of turbulence such as indicated in Fig. 4b will indicate when the proper slip speed has been established. When it is desired to obtain substantially equal depth of turbulence in each layer, the supply of fluids and the throughput thereof are adjusted to appropriately relate the shear gradients in the two layers to their viscosities and densities.

The apparatus may also be operated in horizontal position. In this case the counterflow occurs by reason of the hydraulic pumping head on the layers as illustrated in Fig. 5. The pressure on each of the two liquids in the horizontal apparatus of course is adjusted to a rate that will maintain the interface in the desired position between the walls. Since the two liquids are separated by a centrifugal force equal to 100 g. or more, the maximum rate of throughput is correlated with the relative weights or densities of the liquids as well as with the centrifugal force. Low rates of counterflow are permissible, and easily practiced with this arrangement, as in the extraction of valuable components from vegetable, animal, and fish oils.

Referring now to Fig. 6, a system using two of the columns of Fig. 1 is illustrated. The purpose of the system is to bring about a counterflow reflux fractionation of a binary solute mixture designated $X+Y$. In this system the heavy and light immiscible liquids serve merely as carriers for the solutes and are so chosen that one liquid has at least some preferential solvation for X relative to the other liquid which then has at least some preferential solvation for Y. This means that the concentration ratios of X to Y in the two phases at equilibrium are different.

The two columns 70 and 71 of Fig. 6 are shown connected serially by a hollow shaft 72 which rotates with the inner cylinders and transfers the light liquid from the lower to the upper column, and by a stationary casing 73 which, through sealing means as previously described, transfers the heavy liquid from the upper to the lower column. The means for driving the cylinders of Fig. 6 may be the same as in Fig. 1, and has not been indicated. The details of the end connections are also the same and have been indicated only diagrammatically.

In the operation of the system of Fig. 6, in accordance with my method, assuming it to have been filled with approximately equal amounts of heavy and light solutions and the columns rotated in the manner described for Fig. 1, the fractionation is brought about in the following manner. The light solution from the top of the upper column is fed to an upper evaporator which concentrates the solute and delivers the light solvent in vapor form to an upper condenser. The concentrated solute from the upper evaporator enters an upper mixer in which it mixes with heavy solvent recovered from the lower evaporator, thence passes to the top of the column as a heavy solution. The purpose of these operations is merely to transfer the solute at the top of the column from one liquid solvent to the other. The light solvent recovered at the upper end is reused at the lower end as shown.

A similar transfer occurs at the lower end, the heavy solution entering a lower evaporator and the concentrated solute therefrom entering a mixer to mix with light liquid recovered from the upper end, and then entering the lower end of the lower column.

As thus operated, the system of Fig. 6 causes fractionation of the mixture $X+Y$ and, after a time, the upper and lower ends of the system reach maximum enrichments in X and Y. The refluxed counterflow of solutes in the columns achieves a longitudinal segregation of X and Y in a manner analogous to the operation of a distillation column under total reflux, as will be readily understood.

With the desired enrichment achieved under total reflux, it is then possible to feed $X+Y$ in heavy, light, or mixed vehicles via the valve 74 and to withdraw enriched solutions at 75 and 76. In this manner a continuous yield of the separated components can be realized.

It will be understood that the device may be provided with suitable heat exchangers to elevate the temperature of the contacting liquids and that suitable heat shields, valves, pumps, flow meters, etc., are used where needed.

It will, of course, be understood that the introduction and withdrawal of the respective fluids may be effected in any suitable way. For example, as shown in Fig. 8, the depth of the heavy fluid 85, at the ends of the treating layer, may be radially outwardly extended as at 80, and the heavy fluid may be introduced to or withdrawn from such deepened zone in any suitable manner as by way of channel 81. The lighter fluid space at the ends of the layers may likewise be radially inwardly increased in depth to provide a deepened zone 82 for the introduction and withdrawal of the lighter fluid 86 in any suitable fashion as by way of the channel 83. The two channels, in the form shown in Fig. 8, are separated by a disc 84, which may be similar to the disc 65, Fig. 7. With this arrangement a flange such as the flange 65a (Fig. 7) may be employed if desired. However, it will be appreciated that the viscous drag, which operates through the thin layers of the fluids 85, 86, to cause a high shear gradient therethrough and produce turbulent mixing at the interface 87 between the thin layers, does not produce as great a shear gradient through the thicker bodies of the two fluids in the deepened regions 80, 82, and that the regions of turbulence tend thus in the deepened layers to move away from the interfacial region so that emulsification or mixing in these deepened end zones is minimized. It will further be appreciated that the separator 84, as shown in Fig. 8, may terminate within the deepened region 80 well beyond the interface I between the two fluids, so that full segregation of the entering and leaving fluids is insured.

In the foregoing description, in the interest of complete presentation, I have set forth the theory believed to explain the reasons for the attainment of superior results by the new method and apparatus herein disclosed. While I of course am not to be bound by this theory of operation, it is based on established principles of hydrodynamics and will, it is believed, facilitate the attaining of optimum results in the application of the invention to particular problems.

From the foregoing description it will be apparent that in my new method of facilitating treating contact between thin layers of material, the materials are disposed as cylindrical layers having substantial continuity of thickness, as a uniform, or longitudinally uniformly tapered thickness, and that the materials so disposed are simultaneously subjected to independent forces of turbulent mixing and centrifugal separation acting at right angles to the direction of throughput. It will further be apparent that particulate or liquid catalytic materials of appropriate specific gravity may be carried in one of the fluids or floated therein, or otherwise disposed at the interface between the same, to promote reaction in the interfacial region of intimate emulsifiform mixing; that such particulate material may constitute a turbulizing element promoting turbulent mixing at the interface; that exchangers such as zeolites or resinous exchangers may similarly be employed in suitable circumstances; and that one or more light gaseous, solid and liquid materials may be brought into emulsiform contact with the denser liquid by the present method.

The invention is thus not limited to the illustrative embodiments herein disclosed to exemplify the same, and is intended to embrace all applications and modifications thereof falling within the scope and range of equivalents of the appended claims.

I claim as my invention:

1. The method of facilitating exchange of a component between immiscible fluids of different densities, at least that having the greater density being a liquid, which method comprises disposing the fluids in superimposed continuous sheets having substantial continuity of thickness and a common interface and maintained as separate sheets by an accelerating force acting normal to the sheets to separate the fluids of different density therebetween, flowing the fluids of the sheets longitudinally thereof in a direction of throughput, and simultaneously moving the fluids of the sheets relative to each other in the planes of the sheets transversely of the direction of throughput at a rate producing interdispersion of the fluids at the interfacial region only of the sheets while the accelerating force maintains the integrity of the sheets at either side of said interfacial region.

2. A method according to claim 1 in which the fluids of the continuous sheets are flowed in countercurrent in the direction of throughput.

3. A method according to claim 1 in which the superimposed continuous sheets are maintained in concentric cylindrical form, in which the accelerating force so maintaining them is centrifugal force of rotation of the fluids, in which the direction of throughput is longitudinally of the cylindrical sheets, and in which the transverse relative movement of the sheets is effected by rotating them at respectively different average angular velocities.

4. A method according to claim 3 in which the transverse relative movement of the sheets is effected by rotating them in the same direction at respectively different average angular velocities.

5. A method according to claim 3 adapted for total reflux fractionation of two solutes between two immiscible solvents in which the fluids in the two sheets flow longitudinally thereof in opposite directions and enter and are withdrawn from the respective sheets at the ends thereof, and in which the solute in each of the withdrawn fluids is transferred therefrom to the fluid entering the other sheet.

6. The method of facilitating transfer of components between two substantially immiscible liquid solvents thereof of different densities which consists in effecting counterflow of thin sheets of the two solvents in contact with each other and, while effecting such counterflow, subjecting said sheets to viscous drag to produce relative motion therebetween in a direction transverse to the direction of counterflow to cause interdispersion at the interfacial region of the sheets and at the same time subjecting such sheets to independent centrifugal forces substantially normal to the sheets and throughout the thickness thereof for maintaining separated portions of such sheets other than the interfacial portions thereof.

7. A method according to claim 6 in which said forces of viscous drag are adjusted to induce turbulent mixing of the solvents to a substantial depth in the contacting faces of the sheets thereof.

8. The process of treating one liquid substance with another immiscible liquid substance of different density, which consists in simultaneously (a) centrifugally stratifying said substances in concentric annular layers, (b) rotating the layers at different average angular velocities relative to each other to induce turbulent mixing at the interface between the layers and (c) flowing the layers axially in countercurrent relation, and finally separating the two counter-moving layers into separate streams.

9. The process of facilitating exchange of a component between two immiscible solvents of different densities, which consists in simultaneously (a) centrifugally stratifying the solvents, at least one of which contains a component to be exchanged, in concentric annular layers, (b) rotating the layers at different average angular velocities relative to each other to induce turbulent mixing at the interface between the layers and (c) flowing the layers axially in countercurrent relation, and finally separating the two counter-moving layers into separate streams.

10. A process according to claim 9, further including the step of transferring the component being exchanged from its separated solvent stream passing from the stratified zone to the stream of the other solvent passing to the said zone.

11. Apparatus for facilitating the exchange of a component between immiscible fluids of different densities, at least that having the greater density being a liquid, comprising means for disposing the fluids in superimposed sheets having substantial continuity of thickness and maintained in such sheets by an accelerating force acting normal to the sheets to separate the fluids of different density, means for flowing the fluids of the sheets longitudinally in a direction of throughput, and means for moving fluids of the sheets relative to each other in the planes of the sheets and transversely of the direction of throughput at a rate producing interdispersion of the fluids at the interfacial region only of the sheets, whereby the interdispersing force is independent of the rate of throughput.

12. Apparatus according to claim 11, the means for flowing the fluid sheets longitudinally in a direction of throughput comprising means for flowing the fluid sheets countercurrent to each other.

13. Apparatus according to claim 11, the means for disposing the immiscible fluids in superimposed sheets comprising concentric cylindrical rotatable wall means and means for rotating said wall means to produce the accelerating force centrifugally, and the other means for moving the fluids of the sheets relative to each other transverse of the direction of throughput comprising means for rotating the two wall means in the same direction at sufficiently different angular velocities to produce the interdispersion at the interfacial region only of the sheets, while the accelerating centrifugal force maintains the integrity of those portions of the sheets at either side of the interfacial region thereof.

References Cited in the file of this patent

UNITED STATES PATENTS

| Number | Name | Date |
|---|---|---|
| 1,048,846 | Mottern | Dec. 31, 1912 |
| 1,573,498 | Nicol | Feb. 16, 1926 |
| 1,575,116 | Jones | Mar. 2, 1926 |
| 2,036,924 | Cautor | Apr. 7, 1936 |
| 2,176,982 | Thayer | Oct. 24, 1939 |
| 2,286,157 | Podbielniak | June 9, 1942 |
| 2,474,006 | Maycock | June 21, 1949 |
| 2,474,007 | Maycock | June 21, 1949 |
| 2,528,974 | Ritsch | Nov. 7, 1950 |
| 2,536,423 | Cohen et al. | Jan. 2, 1951 |
| 2,546,186 | Hall | Mar. 27, 1951 |
| 2,551,815 | Schulz | May 8, 1951 |
| 2,553,936 | Patrick | May 22, 1951 |

OTHER REFERENCES

Lochte and Ney: Ind. and Eng. Chem., vol. 33, pp. 825–827 of year 1941.